Jan. 3, 1967  C. ANDERSON  3,295,400
BAND SAW FOR BUTCHERING MEAT
Filed May 5, 1964  2 Sheets-Sheet 1

INVENTOR.
CHARLES ANDERSON
BY Steward & Steward
his ATTORNEYS

Jan. 3, 1967  C. ANDERSON  3,295,400
BAND SAW FOR BUTCHERING MEAT
Filed May 5, 1964  2 Sheets-Sheet 2

INVENTOR.
CHARLES ANDERSON
BY Steward & Steward
his ATTORNEYS 3,295,400
BAND SAW FOR BUTCHERING MEAT
Charles Anderson, 1373 Meriden Road,
Wolcott, Conn. 06716
Filed May 5, 1964, Ser. No. 365,120
6 Claims. (Cl. 83—661)

This application is a continuation-in-part of my prior application Ser. No. 242,721, filed Dec. 6, 1962 and now abandoned.

This invention pertains to band saws, and more particularly to saws of this character for use in butchering meat.

The customary practice in butchering meat is to use a knife to sever the flesh until the cut is interrupted by the presence of a bone. At this point, a meat saw must then be employed to complete the cut. If the bone is located in the center of the meat or if there are a number of bones, the cutting process may well involve alternating between the use of a knife and saw several times in making a single cut transversely through the section of meat in order to complete the cut. This requires a butcher to lay down one cutting implement and pick up another at least one or more times in making each cut through the meat. The operation is thus time-consuming, and in large-scale butchering operations this becomes very significant.

Attempt is accordingly made sometimes to use a continuous power-driven band saw for butchering meat into desired portions or slices of consumer size. In such operations, the saw is used not only to sever the hard bone structure but also the softer flesh portion of the meat. Considerable difficulty has been encountered in this practice, and butchering of meat by this method, although practiced commercially today in large chain stores because of the time-saving afforded by such method, leaves much to be desired from many standpoints.

The difficulties found heretofore in using a band saw for the slicing of the fleshy as well as the bone portions of the meat cuts are several, but perhaps most significant is the poor appearance of the meat surface. It is found that this is due in large part to the spreading of bone dust over the surface of the meat by the conventional band saw blades. Apparently in the cutting process, meat fiber quickly fills up in the gullet or base of the notch between adjacent teeth of the blade. This then causes the bone chips and dust, which have no place to go, to be pushed laterally of the blade and forced into or deposited on the opposing faces of the cut produced by the saw. Tooth-cleaning scrapers, brushes and similar devices that have been proposed for cleaning the teeth while the saw is running have not solved the problem.

Up to now, the only effective means of removing the bone dust is to hand-scrape each cut surface. This is extremely time consuming where large quantities of meat are cut, as in a supermarket.

A further difficulty which arises out of the foregoing is that the roughened surface of the meat produced by the scraping causes it to dry out more rapidly than a smooth, knife-cut surface. The appearance of the meat thus changes quickly and the meat cannot be allowed to remain exposed on the butcher's counter for long as where a knife has been used. The cut surface rapidly becomes darkened and unattractive and this adversely affects the saleability of the product. Wrapping the cut or slice immediately in a transparent foil helps to minimize this difficulty, but there is the added expense of such packaging and it is not a complete answer.

It is therefore a principal object of the present invention to provide a band saw blade for use in butchering meat to take advantage of the time saving which this affords but which does not introduce the attendant difficulties of band saws heretofore used for this purpose. Thus it is one of the main purposes of the invention to provide a band saw blade which may be used for cutting the flesh portion of meat as well as for severing the bone, wherein the cut surface of the meat produced by the saw will be free of bone dust and chips, and thus eliminate the necessity for scraping the surface of the meat after it has been cut.

These and other objects of the invention will become apparent from the description which follows of a band saw blade embodying the features of the invention. It is to be understood that the specific embodiment of saw blade here described is illustrative, and that the invention may be incorporated in band saw blades of specifically different tooth configuration which conform with the concept defined more particulraly in the claims appended hereto.

Figure 4:
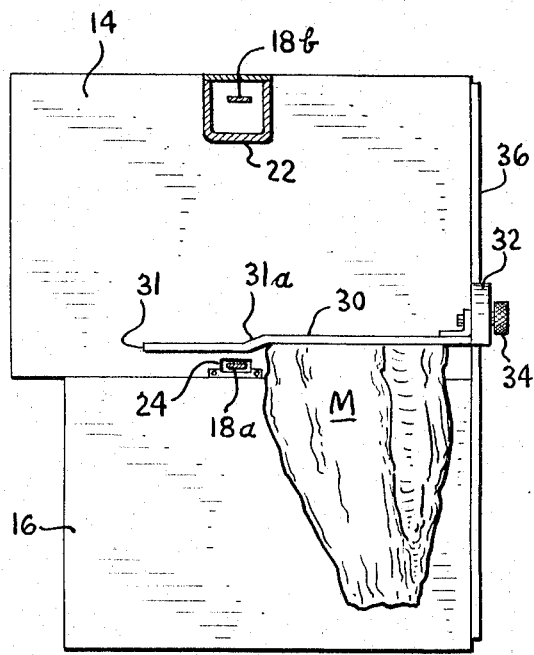
FIG. 4 is a plan view in section on line 4—4 of FIG. 3, looking in the direction of the arrows.
Figure 5:
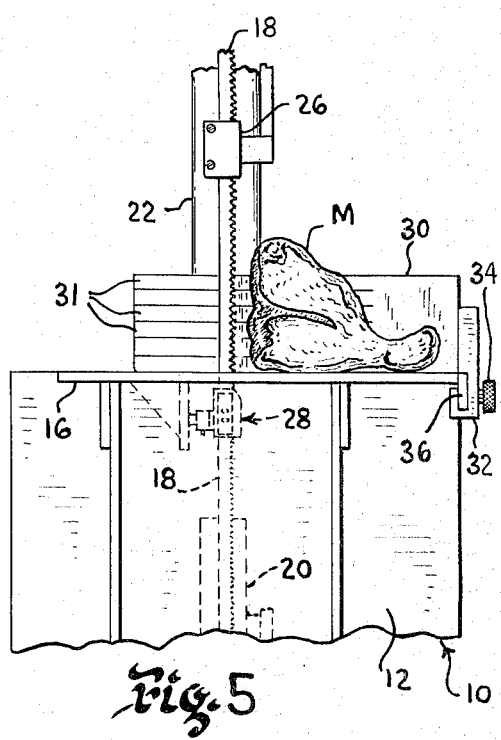
FIG. 5 is a fragmentary view in front elevation.
Figure 3:
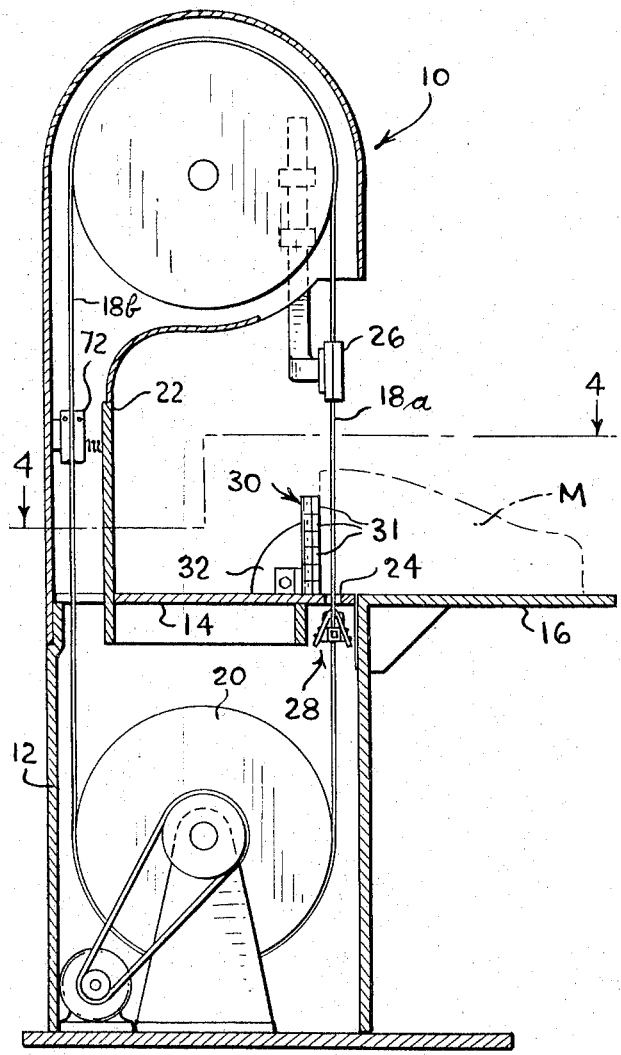
FIG. 3 is a view in end elevation of a typical band saw, parts being broken away and in section for clarity of illustration.

A typical arrangement of a band saw adapted for cutting of meat is shown in FIGS. 3, 4 and 5 of the drawings. Saw 10 comprises an enclosed base 12 on which is mounted a cutting table 14 and a table extension 16. An endless band saw blade 18 is trained over a pair of spaced wheels or pulleys 20, 20. Lower pulley 20 is driven in suitable manner by a motor 21 to cause the blade to travel around the pulleys. At the back edge of the table, the return non-cutting flight of the saw is enclosed by a housing 22 which also serves to support the upper pulley 20. Adjacent the forward edge of the cutting table 14, blade 18 passes through a slot 24 in the table. It is this forward flight, designated 18a in the drawing which does the cutting. The direction of travel of blade 18 in this forward flight is downward toward the top surface of the table, that is, downward as viewed in FIG. 3. Blade guides 26, 28, are commonly provided above and below the surface of table 14 to help maintain the blade straight and free of twist throughout the cutting zone. In this instance, the lower guide also serves as a blade scraper, as appears more fully hereinafter.

Table 14 is provided with an adjustable fence or gage plate 30 secured to a slidable bearing member 32 having clamping means 34 for locking the gage plate a predetermined distance from the plane of cutting flight 18a of the saw. Block member 32 is supported in a track 36 secured to the edge of table 14.

More will be said hereinafter with regard to the particular form of gage plate illustrated, but other than this the saw construction thus far described is generally conventional.

Figure 1:
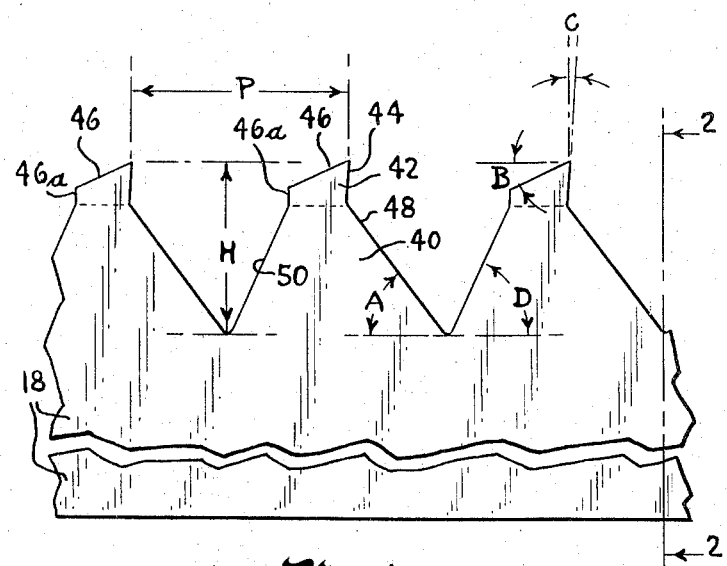
FIG. 1 is a plan view on an enlarged scale of the profile of a band saw blade in accordance with the invention.
Figure 2:
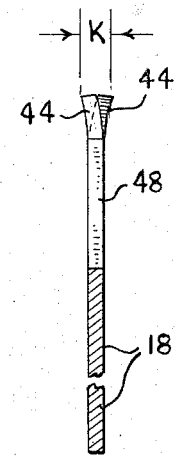
FIG. 2 is a cross sectional view taken on line 2—2 of the blade of FIG. 1.

Referring now more particularly to FIGS. 1 and 2, a section of band saw blade 18 is shown on an enlarged scale embodying the saw tooth profile to which this invention is more particularly directed. Blade 18 is formed of a steel strip which may typically be on the order of 5/8" to 3/4" wide, and around 0.020" thick. This strip is joined at its ends to form a continuous band whose peripheral length may vary typically anywhere from around 90 to 120 inches, depending on the size of the machine in which the blade is used. This band may be, and generally is, heat treated to impart the proper temper prior to punching the teeth in the leading or cutting edge of the blade. It is also of course possible to heat treat and temper only the tooth portion of the saw, after the teeth have been cut, leaving the back portion of the saw in softer condition. This produces a saw of somewhat greater strength but is more expensive.

In FIG. 1 it will be seen that each tooth comprises a major, generally trapezoidal root portion 40 whose longer base is integral with band 18, and a minor outer tip portion 42 joined integrally along its base to the shorter base of root portion 40. Outer tip portion 42 has a cutting edge 44 in the leading face of the tooth, which face is disposed substantially perpendicular to the longitudinal axis of the blade. Outer tip portion 42 also has a trailing edge 46, 46a, which angles back to provide a suitable tip rake, rejoining the root portion 40 to define a smaller trapezoidal tip section, as specifically illustrated in the drawing. Root portion 40, in turn, has a leading edge 48 inclined rearwardly to the longitudinal axis of the blade, and a trailing edge 50 inclined forwardly to the blade axis to meet the trailing edge 46, 46a of the tip.

The angle of leading edge 48 of root portion 40 is critical to the invention. This angle is designated angle A in the drawing, and it has been found that this must be from 45° to 55° in order to obtain the benefits of the invention. Present tests indicate that the optimum angle within this range is about 52°. Maintaining the angle within the limits above indicated produces a clean-surfaced cut on the meat without any need for subsequent scraping to remove bone chips or dust.

The outer tip portion 42 of the tooth which does the actual cutting preferably has a cutting edge 44 which is from $\frac{1}{32}''$ to $\frac{1}{16}''$ long. This dimension will vary with the pitch distance P of the teeth. For meat cutting purposes, the range of tooth pitch in the saw will vary from a fine pitch of $\frac{3}{16}''$ to a coarse pitch of about $\frac{5}{16}''$. In general, the linear speed of the band saw must be increased with the coarser pitch to compensate for this, but a typical linear saw speed of about 4000 feet per minute is common for these saws.

To provide adequate strength in the cutting tip portion 42, its width at the point where it joins root 40 should be a minimum of about $\frac{1}{16}''$. The rake angle B of the trailing edge 46 should ordinarily be about 35°, but this is not especially critical and may typically be from 30° to 40°. It may for example be selected to produce a triangular rather than a trapezoidal profile as here shown for the outer tip 42, in which event the trailing edge portion 46a will be eliminated.

The overall height H of the saw teeth should be from a minimum of around $\frac{1}{8}''$ for a very fine tooth (small pitch) saw to about $\frac{1}{4}''$ for a coarse tooth saw.

The foregoing dimensional considerations will largely determine the angle D of the trailing edge 50 of the root portion. This angle is not critical and will vary considerably with the pitch distance P and tooth height H.

The set of teeth is important. This must be maintained within limits of from 0.003″ as a minimum to about 0.008″ maximum. A low set of 0.003″ is usable, but the life of the blade is relatively short in this case. A tooth set of 0.008″ also is workable but at this point the wiping action of the leading edge 48 of the teeth begins to deteriorate appreciably. Accordingly a set of from 0.004″ to 0.006″ is preferred. This produces a kerf K, with a blade of typical thickness of 0.020″, of from 0.028″ to 0.032″.

For most purposes the cutting face angle C, the angle of cutting edge 44 to the longitudinal axis of the blade, should be perpendicular. Where a fine pitch saw blade is used, it is sometimes desirable however to increase the face angle slightly to provide more clearance between adjacent teeth; that is, increase the size of the gullet between the teeth. An angle C of up to around 6° is permissible for this purpose.

Several examples of preferred dimensions are given as follows. For a band saw blade of nominal $\frac{5}{8}''$ width, the tooth pitch is $\frac{3}{16}''$ and the tooth height is the same, with an angle of 52° (angle A) for the leading edge 48 of the tooth root. The length of the cutting edge 44 in this instance is about $\frac{1}{32}''$ and the forward rake (angle C) of the cutting face is about 6°. The rearward rake (angle B) of the outer tip in this instance is 35°. In a band saw blade of nominal $\frac{3}{4}''$ width, the tooth pitch is $\frac{9}{32}''$, with a tooth height of $\frac{1}{4}''$, again angle A being 52°. In both blades the set of the teeth is from 0.004″ to 0.006″, although the larger set is preferably used only with the larger blade.

The blade hardness is standard for saws of this type and in general will show a reading about 55 Rockwell C.

In using the saw blade, the meat M to be butchered is placed on the saw table and the thickness of the cut is selected by adjustment of gage plate 30. The meat is held against the gage plate and pushed through the saw. In order to take full advantage of the wiping action of the saw blade on the cut surfaces of the meat, the slice being cut should be supported against its natural tendency to curl away from the blade as soon as it is cut. This can be done by manually holding the slice in upright position against the face of the meat from which it has been cut until it is well past the saw blade. Preferably this is done however by using a gage plate such as here illustrated. This plate is formed of suitable metal sheet stock, such as stainless steel, or of plastic. The sheet is slotted forwardly from its rear, unsupported, edge to provide resilient or slightly flexible fingers 31. And in order to further insure the pressing of the meat surfaces against blade 18, fingers 31 are formed with a slight bend or knee 31a (see FIG. 4) immediately ahead of the cutting edge of the blade. This also compensates for the clearance produced by the saw kerf in the course of making the cut.

Saw blades embodying the invention herein described have shown a remarkable improvement over conventional saws in the butchering of meat. This improvement is noted with use of the novel saw blade by itself, but is enhanced and made more uniform when a blade wiper or scraper of the design now to be described is used in conjunction.

Figure 6:
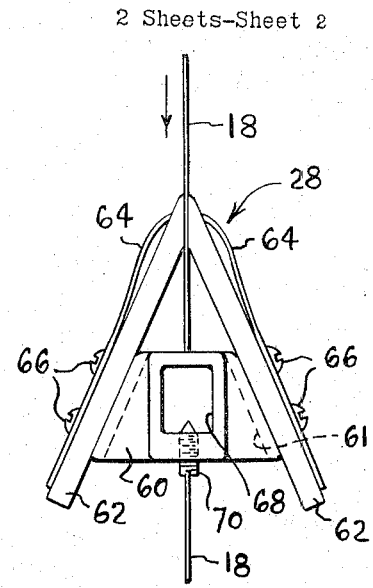
FIG. 6 is an enlarged view of a blade scraping element.
Figure 7:
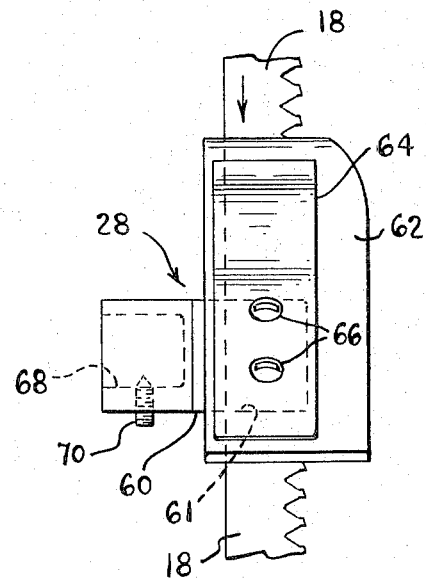
FIG. 7 is a side view of the same element.

Referring to FIGS. 6 and 7 scraper 28 comprises a web member 60, such as a metal casting or forging having oppositely inclined flanges 61 at its ends to each of which is secured a scraping blade 62. These blades converge upwardly to engage saw blade 18, confining the saw between the converging ends. Scraping blades 62 are preferably formed of tough sheet plastic having a low surface friction coefficient, for example "Teflon." In order to maintain the tips of this material in contact with saw blade 18, resilient metal leaf springs 64 are placed over the scraper blades and press them together. Both the leaf springs and the scraping blades are secured in position by machine screws 66 tapped into flanges 61 of the web member 60.

Scraper assembly 28 is removably mounted on a stud (FIG. 3) supported just below table 14, this stud being received in a socket 68 formed in web 60, and a set screw 70 is used to secure the scraper on the stud. Saw blade 18 passes downwardly in its travel between the scraper blades which quickly forms a groove in the converging ends of the scraper blades to accept the saw kerf, but after this the scraper shows very low wear over extended periods of saw operation. Thus scraper blades 62 act as plowing or planing edges on opposite sides of the moving saw blade and remove adherent meat scraps and bone dust from the sides of the saw blade as well as from the gullets of the saw teeth. This helps to prevent accumulation of meat fiber in between the teeth and thus keeps the teeth free to accept and carry off the bone chips and dust. Ordinarily one scraper is enough but, if desired, a second scraper or wiper 72 (see FIG. 3) may be positioned along the saw run.

In prior saw designs, the configuration of the saw teeth is such that the bone chips and dust are forced laterally from between the teeth while passing through the meat and this dust is deposited on the opposite surfaces of the cut before the teeth leave the meat. This difficulty is eliminated by the tooth configuration here disclosed, with the result that scraping the meat becomes unnecessary. The meat looks better and it also shows definite improvement in the length of time during which it may be kept on the butcher's counter. It seems probable that one reason for this is that the thin film of fat, which is spread over the cut surface by reason of the saw teeth passing through the layer of fat found on the surface of meat, is not disturbed and thus acts as a seal or preservative for the meat. Previously this film could not be left on the meat because of the necessity for removing the bone dust, thus unavoidably removing the film of fat.

What is claimed is:

1. A band saw blade for cutting meat comprising a continuous flat steel band having a toothed front edge, each tooth in said front edge having a major, generally trapezoidal root portion whose longer base is integral with said band, and a minor outer tip portion joined integrally along its base to the shorter base of said root portion; said outer tip portion having a cutting edge in the leading face of the tooth which face is disposed substantially perpendicular to the longitudinal axis of the blade, and a trailing edge which angles back from the extremity of said cutting edge to join the trailing edge of said root portion and provide a clearance rake; said root portion having a leading edge inclined rearwardly at an angle of from 45° to 55° to the longitudinal axis of the blade, and a trailing edge inclined forwardly to the blade axis to produce a tooth height of from about one-eighth to one-quarter inch, the teeth in said blade having a pitch of from three-sixteenths to five-sixteenths inch, and a set laterally of the blade of from 0.003 to 0.008 inch.

2. A band saw blade as defined in claim 1, wherein said outer tip portion is approximately one-sixteenth inch wide measured along the blade axis.

3. A band saw blade as defined in claim 1, wherein the trailing edge of said outer tip portion forms an angle of from 30° to 40° to the longitudinal axis of the blade.

4. A band saw blade as defined in claim 1, wherein said cutting edge of said outer top portion of said tooth is approximately one-thirty second to one-sixteenth of an inch long.

5. A band saw blade as defined in claim 1, wherein said leading edge of said root portion of said tooth forms an angle of approximately 52° with the longitudinal axis of the blade, the pitch and height of the teeth are each approximately three-sixteenths of an inch, and the set of the teeth is from 0.004 inch to 0.006 inch.

6. A band saw blade as defined in claim 1, wherein said leading edge of said root portion of said tooth forms an angle of approximately 52° with the longitudinal axis of the blade, the pitch of the teeth is about nine thirty-seconds of an inch, the height of the teeth is about one-quarter of an inch, and the set of the teeth is from 0.004 inch to 0.006 inch.

References Cited by the Examiner
UNITED STATES PATENTS

| 2,849,037 | 8/1958 | Wright | 143—133 |
| 3,072,164 | 1/1963 | Ramirez et al. | 83—661 |

ANDREW R. JUHASZ, *Primary Examiner.*